United States Patent [19]
Hida et al.

[11] 3,806,205
[45] Apr. 23, 1974

[54] DIGITAL TYPE VEHICLE BRAKE CONTROL SYSTEM
[75] Inventors: Takashi Hida; Katsuki Takayama; Kazutaka Kuwana; Junichiro Ooya, all of Kariya, Japan
[73] Assignee: Aisin Seiki Kabushiki Kaisha, Aichi-ken, Japan
[22] Filed: Mar. 16, 1972
[21] Appl. No.: 235,212

[30] Foreign Application Priority Data
Mar. 20, 1971 Japan.............................. 46-16008
Mar. 20, 1971 Japan.............................. 46-16009

[52] U.S. Cl....... 303/21 EB, 188/181 C, 235/150.2, 303/20, 303/21 P, 303/21 CG
[51] Int. Cl................................................ B60t 8/08
[58] Field of Search............ 188/181 C; 235/150.2; 303/20, 21; 317/5; 324/160–161; 340/263

[56] References Cited
UNITED STATES PATENTS
3,608,978   9/1971   Neisch............................ 303/21 EB
3,620,577   11/1971  Neisch et al..................... 303/21 EB
3,589,776   6/1971   Wehde............................ 303/21 CF UX
3,586,385   6/1971   Florus et al.................... 303/21 EB UX Primary Examiner—Duane A. Reger
Assistant Examiner—Stephen G. Kunin
Attorney, Agent, or Firm—Holman & Stern

[57] ABSTRACT

A digital type vehicle brake control system which serves to interrupt the communication of the brake fluid pressure between a master cylinder and the wheel cylinders of the vehicle and to vary the fluid volumes in the system, in which a digital type control is applied throughout the brake control processes from detection of the wheel rotational conditions up to control of the brake fluid pressure.

6 Claims, 16 Drawing Figures

FIG. 4

| | Q | Q̄ |
|---|---|---|
| T | | |
| R | S | |

T: TRIGGER TERMINAL
Q: "1" TERMINAL
Q̄: "0" TERMINAL
R: RESET TERMINAL
S: SET TERMINAL

| S | R | Q | Q̄ |
|---|---|---|---|
| L | L | (H) | (H) |
| L | H | H | L |
| H | L | L | H |
| H | H | $Q_n$ | $\overline{Q_n}$ |

IN CASE NO WIRING IS MADE TO TERMINALS S AND R, THEY ARE AT THE "H" LEVEL $Q_n$: WHEN THE LEVEL OF THE TRIGGER TERMINAL IS CHANGED FROM "H" TO "L", THE CONDITION IMMEDIATELY BEFORE THIS CHANGE IS INVERTED

FIG. 5

| | Q | Q̄ |
|---|---|---|
| T | | S |
| D | | |

| $t_n$ | $t_{n+1}$ | |
|---|---|---|
| D | Q | Q̄ |
| L | L | H |
| H | H | L |

$t_n$: BIT TIME BEFORE CLOCK PULSE
$t_{n+1}$: BIT TIME AFTER CLOCK PULSE

WHILE CLOCK PULSE IS AT THE "H" LEVEL, INFORMATION GIVEN TO INPUT D IS TRANSFERRED TO OUTPUT Q AS IT IS WHEN CLOCK PULSE COMES TO BEAT "L" LEVEL, OUTPUT Q REMAINS UNCHANGED UNTIL CLOCK PULSE COMES TO BE "H" LEVEL A DIRECT SETTING CAN BE MADE

| S | Q | Q̄ |
|---|---|---|
| L | H | L |

IN CASE NO WIRING IS MADE TO TERMINALS, IT IS AT "H" LEVEL

FIG. 6

| INPUT | | | | OUTPUT | | | | | | | | | | INPUT | | | | OUTPUT | | | | | | | | | |
|---|---|---|---|---|---|---|---|---|---|---|---|---|---|---|---|---|---|---|---|---|---|---|---|---|---|---|---|
| D | C | B | A | 0 | 1 | 2 | 3 | 4 | 5 | 6 | 7 | 8 | 9 | D | C | B | A | 0 | 1 | 2 | 3 | 4 | 5 | 6 | 7 | 8 | 9 |
| L | L | L | L | L | H | H | H | H | H | H | H | H | H | H | L | L | L | H | H | H | H | H | H | H | H | L | H |
| L | L | L | H | H | L | H | H | H | H | H | H | H | H | H | L | L | H | H | H | H | H | H | H | H | H | H | L |
| L | L | H | L | H | H | L | H | H | H | H | H | H | H | H | L | H | L | H | H | H | H | H | H | H | H | H | H |
| L | L | H | H | H | H | H | L | H | H | H | H | H | H | H | L | H | H | H | H | H | H | H | H | H | H | H | H |
| L | H | L | L | H | H | H | H | L | H | H | H | H | H | H | H | L | L | H | H | H | H | H | H | H | H | H | H |
| L | H | L | H | H | H | H | H | H | L | H | H | H | H | H | H | L | H | H | H | H | H | H | H | H | H | H | H |
| L | H | H | L | H | H | H | H | H | H | L | H | H | H | H | H | H | L | H | H | H | H | H | H | H | H | H | H |
| L | H | H | H | H | H | H | H | H | H | H | L | H | H | H | H | H | H | H | H | H | H | H | H | H | H | H | H |

FIG. 7

| COUNT | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| OUTPUT D | L | L | L | L | L | L | L | L | H | H | H | H | H | H | H | H |
| OUTPUT C | L | L | L | L | H | H | H | H | L | L | L | L | H | H | H | H |
| OUTPUT B | L | L | H | H | L | L | H | H | L | L | H | H | L | L | H | H |
| OUTPUT A | L | H | L | H | L | H | L | H | L | H | L | H | L | H | L | H |

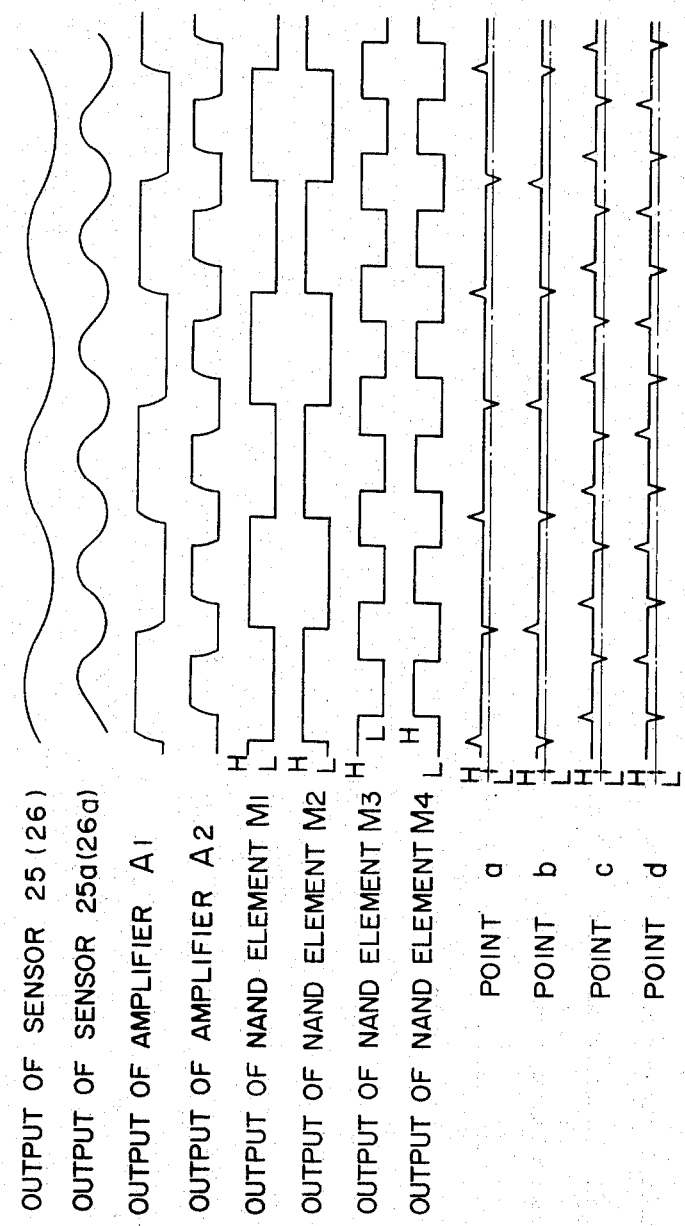

FIG. 9(a)

| COUNT | 0 1 2 3 4 5 6 7 | ... 112 | ... 119 | 120 ... 127 |
|---|---|---|---|---|
| | 8 --- 15 | | | |
| | 16 --- 23 | | | |
| | 24 --- 31 | | | |
| | 32 --- 39 | | | |
| | 40 --- 47 | | | |
| | 48 --- 55 | | | |
| | 56 --- 63 | | | |
| | 64 --- 71 | | | |
| | 72 --- 79 | | | |
| | 80 --- 87 | | | |
| | 88 --- 95 | | | |
| | 96 --- 103 | | | |
| | 104 --- 111 | | | |
| OUTPUT A OF COUNTER B1 | LHLHLHLH | LHLHLHLH | LHLHLHLH | LHLHLHLH |
| OUTPUT B OF COUNTER B1 | LLHHLLHH | LLHHLLHH | LLHHLLHH | LLHHLLHH |
| OUTPUT C OF COUNTER B1 | LLLLHHHH | LLLLHHHH | LLLLHHHH | LLLLHHHH |
| OUTPUT A OF COUNTER B2 | | LLLLLLLL | LLLLLLLL | HHHHHHHH |
| OUTPUT B OF COUNTER B2 | | HHHHHHHH | HHHHHHHH | HHHHHHHH |
| OUTPUT C OF COUNTER B2 | | HHHHHHHH | HHHHHHHH | HHHHHHHH |
| OUTPUT D OF COUNTER B2 | | HHHHHHHH | HHHHHHHH | HHHHHHHH |

FIG. 9(b)

| COUNT | 0 1 2 3 4 5 6 7<br>8 - - - - - - 15<br>16 - - - - - - 23<br>24 - - - - - - 31<br>32 - - - - - - 39<br>40 - - - - - - 47<br>48 - - - - - - 55<br>56 - - - - - - 63<br>64 - - - - - - 71<br>72 - - - - - - 79<br>80 - - - - - - 87<br>88 - - - - - - 95<br>96 - - - - - - 103<br>104 - - - - - - 111 | 112 - - - - - 119 | 120 - - - - - 127 |
|---|---|---|---|
| OUTPUT OF NAND ELEMENT M8 | HHHHHHHH | LLLLLLL | LLLLLLLL |
| OUTPUT OF NOR ELEMENT N1 | LLLLLLLL | HHHHHHH | LLLLLLLL |
| INPUT D OF DECODER E1 | HHHHHHHH | LLLLLLL | HHHHHHHH |
| INPUT 1 OF DECODER E1 | HHHHHHHH | HHHHHHH | HHHHHHHH |
| INPUT 3 OF DECODER E1 | HHHHHHHH | HHH(L)HHHH | HHHHHHHH |
| INPUT 5 OF DECODER E1 | HHHHHHHH | HHHHH(L)HH | HHHHHHHH |
| INPUT 7 OF DECODER E1 | HHHHHHHH | HHHHHHH(L) | HHHHHHHH |

——————— H  OUTPUT OF NAND ELEMENT M34

——————— L  OUTPUT OF NAND ELEMENT M33

——————— L  OUTPUT OF NAND ELEMENT M30

——————— H  OUTPUT OF NAND ELEMENT M31

——————— H  OUTPUT OF NAND ELEMENT M32

| H | L | H | L | H | L | H | L | H | F8, OUTPUT Q |
|---|---|---|---|---|---|---|---|---|---|
| H | L | L | H | H | L | L | H | H | F9, OUTPUT Q |
| H | L | L | L | L | H | H | H | H | F50 (F10) OUTPUT Q |
| L | H | H | H | H | L | L | L | L | F50 (F10) OUTPUT $\bar{Q}$ |
| L | H | H | H | H | H | H | H | H | F51 (F11) OUTPUT Q |
| H | L | L | L | L | L | L | L | L | F51 (F11) OUTPUT $\bar{Q}$ |
| H | H | H | H | H | H | H | H | H | F52 (F12) OUTPUT Q |
| L | L | L | L | L | L | L | L | L | F52 (F12) OUTPUT $\bar{Q}$ |
| L | L | L | L | L | L | L | L | L | F53 (F13) OUTPUT Q |
| H | H | H | H | H | H | H | H | H | F53 (F13) OUTPUT $\bar{Q}$ |
| 23 | 24 | 25 | 26 | 27 | 28 | 29 | 30 | 31 | COUNT |

FIG. 12

OUTPUT $\bar{Q}$ OF FLIPFLOP F19 IS TRANSFERRED, AS IT IS, TO OUTPUT $\bar{Q}$ OF FLIPFLOP F54

FLPFlOPS F17 TO F21 ARE RESET

OUTPUT OF NOR ELEMENT N2

OUTPUT OF NAND ELEMENT M39

OUTPUT OF NAND ELEMENT M40

| COUNT | 0 | 1 | 2 | 3 | 4 | 5 | 6 | 7 |
|---|---|---|---|---|---|---|---|---|
| F16 OUTPUT Q | L | L | L | L | H | H | H | H |
| F15 OUTPUT Q | L | L | H | H | L | L | H | H |
| F14 OUTPUT Q | L | H | L | H | L | H | L | H |

DIGITAL TYPE VEHICLE BRAKE CONTROL SYSTEM

BACKGROUND OF THE INVENTION

If a conventional vehicle brake system exerts an emergency brake force, when the coefficient of friction between a road surface and the wheel tire of the vehicle is small, and while an engine driving force is applied to the wheels — the driving wheels are frequently locked because the wheel speed is only restored slowly even if the brake liquid pressure is reduced.

In additional, where the brake liquid pressure is controlled in this type of conventional brake control systems, the pressure-reducing rate and pressure-restoring rate with respect to the brake liquid pressure are determined in accordance with a predetermined pattern. Therefore, the brake control system cannot sufficiently follow the speed variation of the wheel being braked, as a result of which the speed variation of the wheel being braked increases, the braking distance also increases, and the stability and steerage of the vehicle is lowered.

SUMMARY OF THE INVENTION

Accordingly a first object of the present invention is to provide a digital type vehicle brake control system, in which the travelling stability of a vehicle during braking is secured by preventing the locking phenomena which occurs during application of an emergency brake, so that optimum brake force can be obtained under any condition.

A second object of the present invention is to provide a digital type vehicle brake control system, in which by application of digital type means the rate of brake pressure application is varied and the variation of the wheel control rate is made to be small when compared with a conventional anti-skid brake control system, whereby the vehicle travelling stability is improved and the braking distance is reduced.

A third object of the present invention is to provide a digital type vehicle brake control system, in which a circuit for controlling a brake liquid pressure does not include an analog circuit, and therefore errors caused by variation on the characteristics of elements which form the brake control system and by frequency characteristics thereof can be reduced.

A fourth object of the present invention is to provide a digital type vehicle brake control system, in which a special temperature compensation circuit is not necessary for counteracting temperature-drift which is caused by the temperature dependability of elements constituting the brake control system, and even though the characteristics of the elements used in the brake control system vary with elapse of time the capability of a computer is not affected by the variation on the characteristics.

A fifth object of the present invention is to provide a digital type vehicle brake control system, in which tolerances for the precisions of elements which form the brake control system can be relatively large, and a digital circuit which does not employ an inductance or a capacitor having a large capacity is used thereby to be suitable for a large scale production as an integrated circuit.

A sixth object of the present invention is to provide a digital type vehicle brake control system, in which the rate of controlling the brake liquid pressure of a vehicle corresponds to the variation of the speed of the wheel being braked and the pressure-reducing rate and pressure-restoring rate are variably controlled in double steps, as a result of which the variation on the wheel speed is considerably small and the braking distance of the vehicle is much shorter than that in the conventional brake control system.

The foregoing objects and other objects as well as the characteristics features of the present invention will become more apparent from the following detailed description and the appended claims when read in conjunction with the accompanying drawings.

BRIEF DESCRIPTION OF THE INVENTION

FIGS. 4 and 5 exhibit the truth tables of flipflop circuits;

FIG. 6 is the truth table of a decoder;

FIG. 7 is the truth table of a counter; and

FIGS. 8a, 8b, 9a, 9b, 10, 11a, 11b, and 12 explain the operational conditions of various elements used in the present invention.

In connection with the accompanying drawings, FIGS. 3, 8, 9 and 11 are divided into two parts (a) and (b), respectively, because each of the figures are too large to be put on one sheet.

DETAILED DESCRIPTION OF A PREFERRED EMBODIMENT OF THE INVENTION

Figure 1:
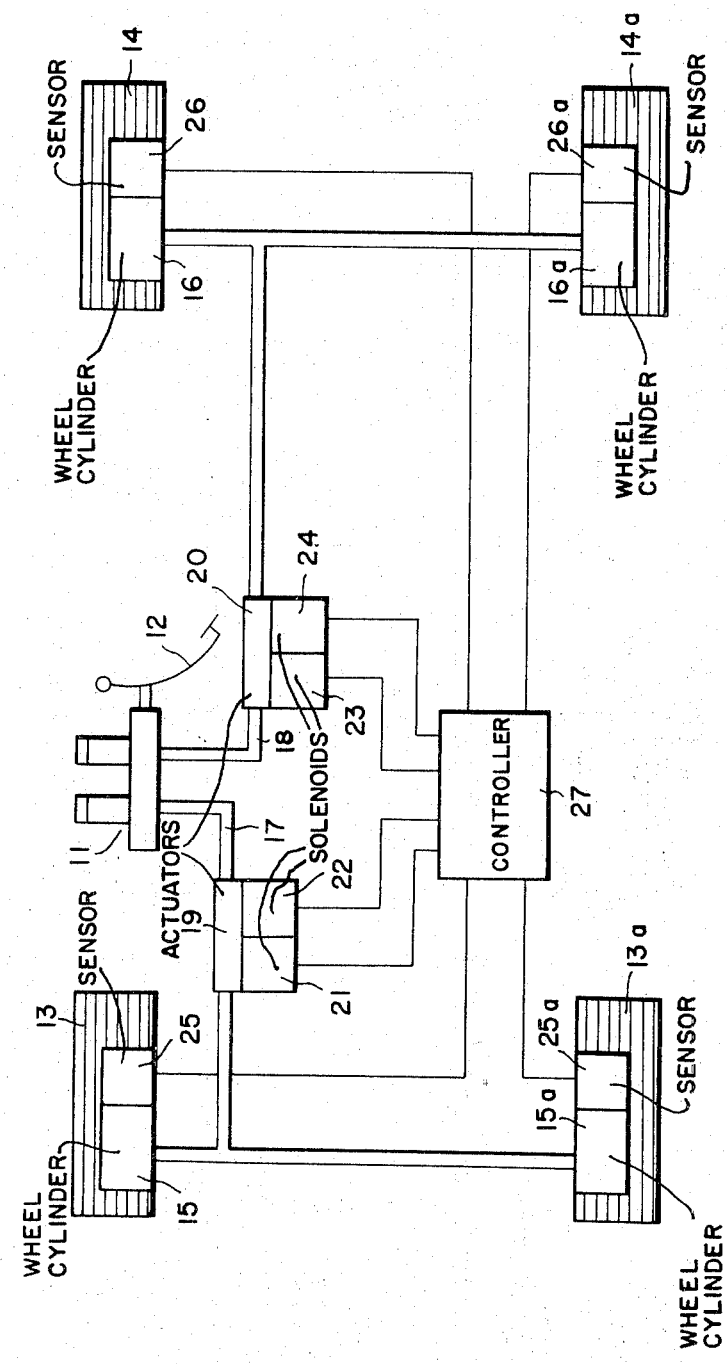
FIG. 1 shows an embodiment of the vehicle brake system according to the present invention.

With reference now to FIG. 1, namely, a systematic diagram, there is shown an embodiment of the present invention, which comprises a well-known tandem master cylinder 11 which is adapted to produce a hydraulic oil pressure by depressing a brake pedal; pipes 17 and 18 which communicate between the master cylinder 11 and wheel cylinders 15, 15a, 16 and 16a provided in front and rear wheels 13, 13a, 14 and 14a, respectively; actuators 19 and 20 provided in the middle parts of the pipes 17 and 18, respectively, said actuators being adapted to control the oil pressure from the master cylinder 11 with the aid of electromagnetic solenoids 21, 22, 23 and 24, and to exert thus controlled oil pressure on the wheel cylinders 15, 15a, 16 and 16a, respectively; sensors 25, 25a, 26 and 26a provided on the front and rear wheels 13, 13a, 14 and 14a respectively, said sensors being adapted to produce electrical signals in the form of sine waves or pulse waves corresponding to the revolutions of the wheels; and a controller 27 which receives the outputs of the sensors 25, 25a, 26 and 26a thereby to apply electrical signals to the actuators 19 and 20 as described later. The actuators 19 and 20 serve to control the braking pressure of the master cylinder 11 in accordance with the electrical signals produced by the controller 27 and to exert the thus controlled braking pressure on the wheel cylinders 15, 15a, 16 and 16a.

Figure 2:
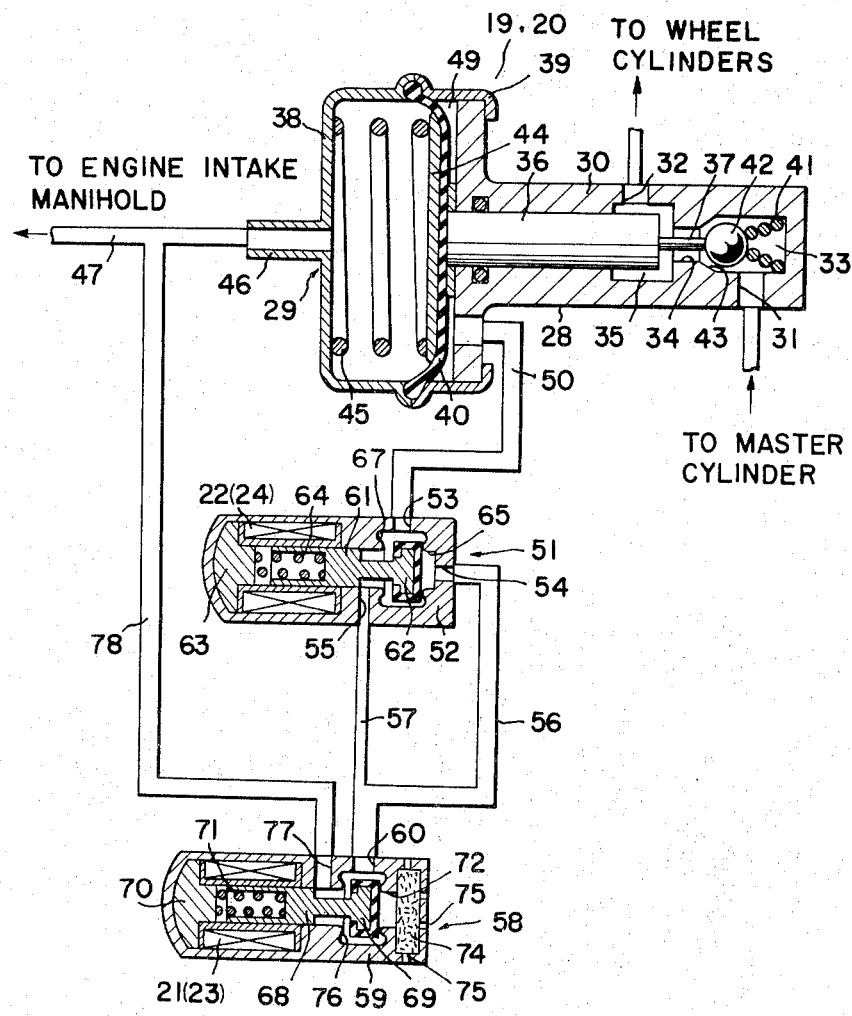
FIG. 2 is a longitudinally sectioned view of an actuator employed in the brake control system according to the present invention.

Referring now to FIG. 2, there is exhibited an embodiment of the actuators 19 and 20, which comprises a body 28 and a fluid pressure type differential device 29. Passages 31 and 32 are formed in the cylinder 30 of the body 28, and the passages 31 and 32 communicate with the master cylinder 11 and the wheel cylinders 15, 15a, 16 and 16a, respectively. The passage 31 communicates with the other passage 32 through a chamber 33. a passage 34 and a passage 35. The body 28 is further provided with a plunger 36 which is slidably fitted in the cylinder 30 in its axial direction. The plunger 36 has a protruded part 37 on its right end, and the diameter of the protruded part 37 is smaller than that of the plunger 36, while the left end of the plunger 36 is connected to a diaphragm 40 whose peripheral portion is inserted between the joining parts of housing 38 and 39. A ball valve 42 is held in contact with the protruded part 37 of the plunger 36 by means of a spring 41 which is supported in the chamber 33. The cylinder 30 forms a valve seat 43 for the ball valve 42. The diaphragm 40 is provided with a spring retainer 44, and a restoring spring 45 is loaded between the spring retainer 44 and the housing 38.

A passage 46 is also formed in the housing 38. The passage 46 communicates with an engine intake manifold (not shown) through a pipe 47 and also with a chamber 49. The chamber 49 is formed by the housings 38 and 39, and the cylinder 30, and is divided into two parts by means of the diaphragm 40 thereby providing an additional chamber 49 in it. The chamber 49 thus provided communicates with a passage 53 through a pipe 50, the passage 53 being provided in the housing 52 of an electromagnetic switching valve 51.

The housing 52 of the electromagnetic switching valve 51 is further provided with passages 54 and 55 which in turn communicate respectively through pipes 56 and 57 with a passage 60 formed in the housing 59 of an electromagnetic air-switching valve 58. A plunger 61 is slidably fitted in the electromagnetic switching valve 51, and one of the ends of the plunger 61 is formed to be a valve 62. Under normal conditions, the valve 62 is abutted against an annular valve seat 65 provided on the housing 52, by means of a spring 64 loaded between the other end of the plunger 61 and a plug 63. Under this condition, the communication between the pipes 50 and 56 is interrupted or cut off, whereas the communication between the pipes 50 and 57 is established.

The passage cross-sectional area of the pipe 57 is smaller than that of the pipe 56. The previously mentioned electromagnetic solenoid 22 (24) is wound on the peripheral part of the plunger 61. When the electromagnetic solenoid 22 (24) is energized, the plunger 61 is attracted toward the left (in FIG. 2) against the electric force of the spring 64, while the valve 62 is moved off the annular valve seat 65 and is abutted against the other valve seat 67 provided in the valve 51.

The arrangement of the electromagnetic air-switching valve 58 is almost similar to that of the electromagnetic switching valve 51. That is, a valve 69 is provided on one of the ends of a plunger 68 which is slidably fitted in the electromagnetic air-switching valve 58. Under normal conditions, the valve 69 is abutted against an annular valve seat 72 formed in the housing 59, by the elastic force of a spring 71 which is loaded between the plunger 68 and a plug 70. The previously described electromagnetic solenoid 21 (23) is wound on the peripheral portion of the plunger 68. The air-switching valve 58 is further provided with an air filter 74 which opens to the atmosphere through passages 75, and under the conditions shown in FIG. 2 the communication between the pipes 56 and 57 and the atmosphere is cut off. When the electromagnetic solenoid 21 (23) is energized, the plunger 68 is attracted toward the left (in FIG. 2) against the elastic force of a spring 71 and at the same time the valve 69 is moved off the valve seat 72 and is abutted against the other valve seat 76 provided in the housing 59. A passage 77 is formed in the housing 59 so as to communicate with the intake manifold.

The operations of the actuators 19 and 20 are as follows:

Since a pipe 78 is connected to the engine intake manifold (not shown), the pipe 78 remains negative in pressure at all times, and the passages 75 open to the atmosphere. When no electric current flows through the electromagnetic solenoid 21 (23), or the solenoid 21 (23) is not excited, the plunger 68 cuts off the communication between the passages 75 and 60 and at the same time establishes the communication between the pipe 78 and the passage 60. Therefore, the passage 60 is brought to be negative in pressure, as a result of which the chamber 49 of the fluid pressure type differential device 29 is also made to be negative in pressure through the electromagnetic switching valve 51. On the other hand, the chamber 48 also communicates with the engine intake manifold, and the pressure in the chamber 49 is always negative. Therefore, the diaphragm 40 serves to push the ball valve 42 toward the right (in FIG. 2) with the aid of the plunger 36 and to hold the ball valve 42 against the elastic force of the spring 41 as shown in FIG. 2, whereby the oil pressure of the master cylinder is made to be equal to those of the wheel cylinders.

Now, when an electric current is applied to flow through the electromagnetic solenoid 21 (23) thereby to produce a magnetic force therefrom, the plunger 68 is moved leftwardly against the elastic force of the spring 71 by the thus produced magnetic force, as a result of which the communication between the pipe 78 and the passage 60 is cut off and the communication between the atmosphere passages 75 and the passage 60 is set up. This means that the atmospheric pressure is applied to the chamber 49 through the filter 74, passage 60, electromagnetic switching valve 51 and pipe 50 thereby to change the negative pressure of the chamber 49 to be equal to the atmospheric pressure. As a result, the diaphragm 40 is displaced against the elastic force of the spring 45 in such a direction that the ball valve 42 interrupts the communication between the master cylinder 11 and the wheel cylinders 15, 15a, 16 and 16a. The plunger 36 maintains its displacement even after the communication between the master cylinder 11 and the wheel cylinders 15, 15a, 16 and 16a has been cut off, so that the chamber 35 increases in volume. As a result of which the oil pressures of the wheel cylinders 15, 15a, 16 and 16a are reduced.

Under this condition, if an electric current to the electromagnetic solenoid 21 (23) is cut off, the plunger 68 is returned back to the position shown in FIG. 2 by the elastic force of the spring 71 thereby to establish the communication between the pipe 78 and the passage 60 and to cut off the communication between the atmospheric passages 75 and the passage 60. Accordingly, the pressure of the chamber 49 is changed from the atmospheric pressure to the negative pressure, and the diaphragm 40 is moved by the elastic force of the spring 45 in such a direction that the volume of the chamber 35 decreases, and after the reduced oil pressure of the wheel cylinders has been restored back its original pressure, the ball valve 42 is relieved against the elastic force of the spring 41 thereby to make equal both oil pressures of the wheel cylinders and master cylinder. In other words, the electromagnetic air-switching valve 58 reduces the oil pressure of the wheel cylinders upon application of the electric current to the electromagnetic solenoid 21 (23), and restores the oil pressure of the wheel cylinders back to that of the master cylinder when the flow of the electric current in the electromagnetic solenoid 21 (23) is cut off.

When no electric current flows through the electromagnetic solenoid 22 (24) of the electromagnetic switching valve 51, the communication between the pipes 56 and 50 is cut off while the pipes 57 and 50 are communicated with each other. As stated before, the inside diameter of the pipe 57 is smaller than that of the pipe 56, as a result of which a rate at which the pressure of the chamber 49 is varied from the negative pressure to the atmospheric pressure or vice versa becomes slower than in the case when the pressure in the chamber 49 is made to be variable through the pipe 56. Therefore, the moving rate of the diaphragm 40 and plunger 36 is caused to be slower, and the pressure-reducing rate and pressure-restoring rate of the wheel cylinder oil pressure are caused to be slow.

When the electric current flows through the electromagnetic solenoid 22 (24) of the electromagnetic switching valve 51, the plunger 61 is moved leftwardly against the elastic force of the spring 64, as a result of which the communication between the pipes 50 and 57 is cut off while the pipes 50 and 56 are communicated with each other. Since the inside diameter of the pipe 56 is much larger than that of pipe 57, a rate at which the pressure of the chamber 49 is varied from the negative pressure to the atmospheric pressure or vice versa is quicker than in the above-mentioned case where the rate is slower, as a result of which the moving rate of the diaphragm 40 and plunger 36 is also caused to be quicker and the pressure-reducing rate and pressure-restoring rate of the wheel cylinders are made to be quicker. In other words, the electromagnetic switching valve 51 serves to make quick the pressure-reducing rate and pressure-restoring rate of the wheel cylinder's oil pressure upon application of an electric current to the electromagnetic solenoid 22 (24), and serves to make said rates slow when the application of the electric current to the solenoid 22(24) is ceased.

Figure 3A:
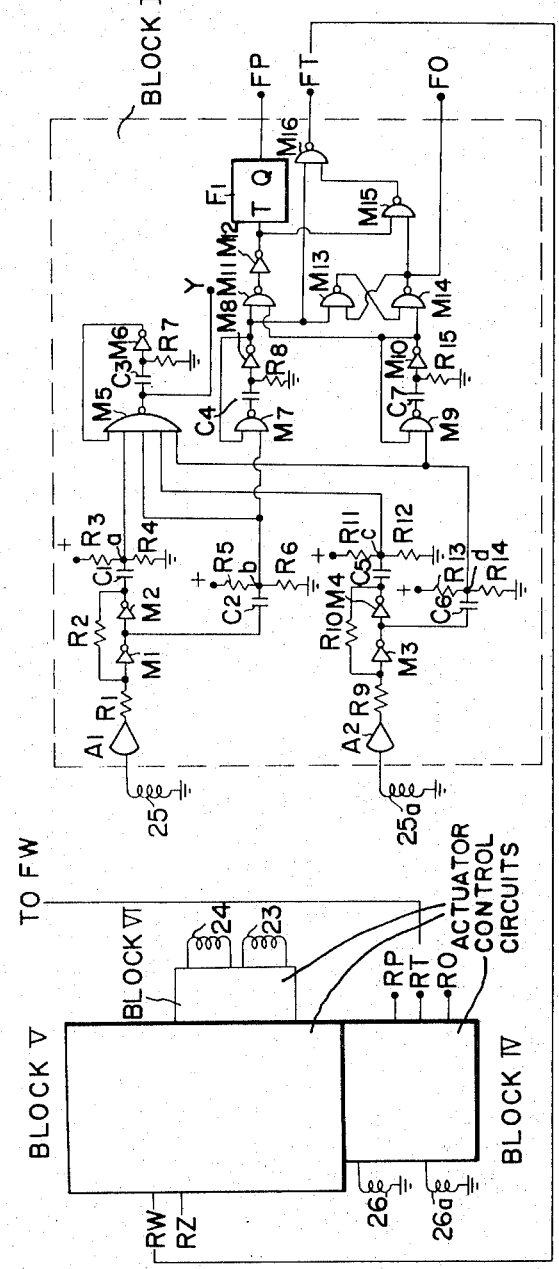
FIGS. 3a -3b illustrate an embodiment of the electrical circuit employed in the present invention.
Figure 3B:
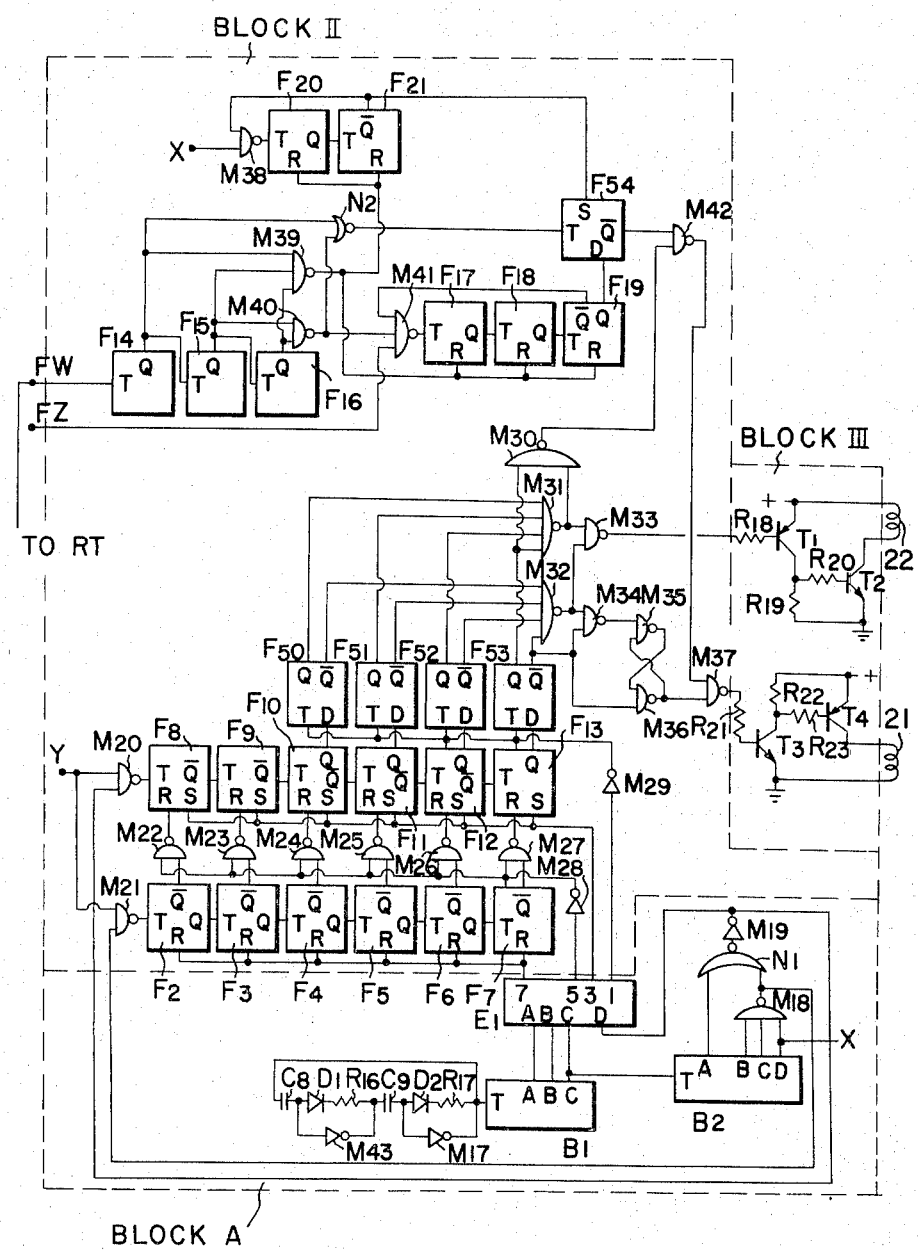
Figure 8B:
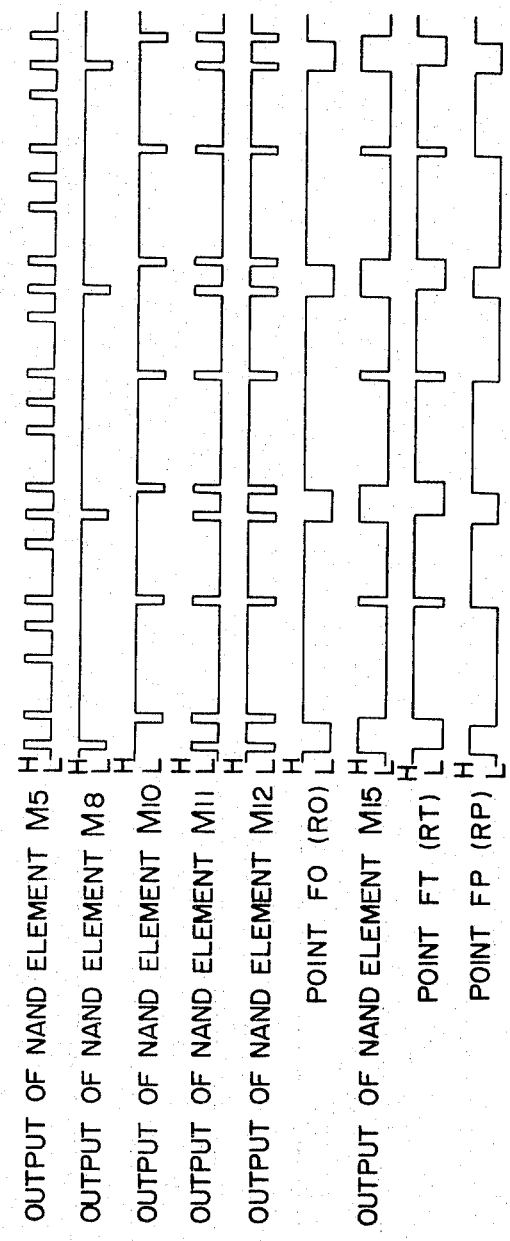

Shown in FIG. 3 is an embodiment of the controller described with reference to FIG. 1, which comprises six blocks, block I through block VI. Blocks I to III mainly serve to control the actuator 19 provided for the front wheels, whereas blocks IV to VI mainly serves to control the actuator 20 provided for the rear wheels. The circuit compositions of blocks I to III are similar to those of blocks IV to VI, and therefore a detailed description of the later circuits will not be given.

Amplifiers $A_1$ and $A_2$ may be, of course, any of the operation amplifier, IC amplifier and transistor circuit amplifier. NAND elements $M_1$ through $M_{43}$ have amplification and NAND functions — that is, only when all the inputs of the NAND element are at "H" levels, its output will be at an "L" level, and when any of the inputs is at the "L" level, its output will be at the "H" level. In this connection, the "H" level means a high logic potential while the "L" level means a low logic potential.

NOR elements $N_1$ and $N_2$ have amplification and NOR functions — that is, only when all the inputs of the NOR element are at an "L" levels, its output will be at an "H" level, and when any of the inputs is at the "H" level, its output will be at the "L" level. Flipflops $F_1$ to $F_{21}$ are of direct connection type R-S flipflops whose truth table is as shown in FIG. 4. Flipflops $F_{50}$ to $F_{54}$ are of D flipflops whose truth table is as shown in FIG. 5. A decoder $E_1$ is a binary coded decimal decoder, whose truth table is as shown in FIG. 6. Counters $B_1$ and $B_2$ are 4-bit binary counters whose truth table is as shown in FIG. 7.

The circuit compositions of all the blocks are as follows. First of all, blocks I and IV will be described.

In blocks I and IV; the output of the sensor 25 (for the right front wheel) is connected to the input of the amplifier $A_1$ in block I, and the output of the sensor 26 (for the right rear wheel) is connected to the input of the amplifier $A_1$ in block IV. In the same way, the output of the sensor 25a (for the left front wheel) is connected to the input of the amplifier $A_2$ in block I, and the output of the sensor 26a (for the left rear wheel) is connected to the input of the amplifier $A_2$ in block IV. The output of the amplifier $A_1$ is connected through a resistor $R_1$ to the NAND element $M_1$ whose output is connected to the NAND element $M_2$ and to a capacitor $C_2$. The output of the NAND element $M_2$ is connected to one terminal of a capacitor $C_1$, and through a resistor $R_2$ to the resistor $R_1$ and the input of the NAND element $M_1$. Said resistors $R_1$ and $R_2$ and NAND elements $M_1$ and $M_2$ constitute a well-known wave form shaping circuit. The other terminal of the capacitor $C_1$ is connected to one terminal of a resistor $R_3$, one terminal of a resistor $R_4$, and an input of the NAND element $M_5$. The other terminal of the resistor $R_3$ is connected to an electrical source voltage, and the other terminal of the resistor $R_4$ is grounded. The capacitor $C_1$ and resistor $R_3$ and $R_4$ form a well-known differentiation circuit. The other terminal of the capacitor $C_2$ is connected to the terminals of resistors $R_5$ and $R_6$, an input of the NAND element $M_5$, and an input of the NAND element $M_7$. Said capacitor $C_2$ and resistors $R_5$ and $R_6$ constitute a well-known differentiation circuit. The other terminal of the resistor $R_5$ is connected to the electrical source voltage, and the other terminal of the resistor $R_6$ is grounded.

The output of the amplifier $A_2$ is connected through a resistor $R_9$ to the NAND element $M_3$, and the output of the NAND element $M_3$ is in turn connected to the NAND element $M_4$ and one terminal of a capacitor $C_6$. The output of the NAND element $M_4$ is connected to one terminal of a capacitor $C_5$ and through a resistor $R_{10}$ to the NAND element $M_3$. The resistors $R_9$ and $R_{10}$, and NAND elements $M_3$ and $M_4$ form a well-known waveform shaping circuit. The other terminal of the capacitor $C_5$ is connected to terminals of resistors $R_{11}$ and $R_{12}$ and to an input of the NAND element $M_5$. The other terminal of the resistor $R_{11}$ is connected to the electrical source voltage, and the other terminal of the resistor $R_{12}$ is grounded. The capacitor $C_5$ and resistors $R_{11}$ and $R_{12}$ in combination form a well-known differentiation circuit.

The other end of the capacitor $C_6$ is connected to terminals of resistors $R_{13}$ and $R_{14}$, an input of the NAND element $M_5$, and an input of the NAND element $M_9$. The other terminal of the resistor $R_{13}$ is connected to the electrical source voltage, and the other terminal of the resistor $R_{14}$ is grounded. The capacitor $C_6$ and resistors $R_{13}$ and $R_{14}$ in combination form a well-known differentiation circuit. The output of the NAND element $M_5$ is connected to one terminal of a capacitor $C_3$, and in block II to an input of the NAND element $M_{20}$ and an input of the NAND element $M_{21}$. The other terminal of the capacitor $C_3$ is connected to one terminal of a resistor $R_7$ and an input of the NAND element $M_6$. The other terminal of the resistor $R_7$ is grounded. The output of the NAND element $M_6$ is connected to an input of the NAND element $M_5$.

The output of the NAND element $M_7$ is connected through a capacitor $C_4$ to one terminal of a resistor $R_8$ and an input of the NAND element $M_8$. The other terminal of the resistor $R_8$ is grounded. The output of the NAND element $M_8$ is connected to inputs of the NAND elements $M_7$, $M_{11}$, $M_{16}$ and $M_{13}$, respectively. The output of the NAND element $M_9$ is connected through a capacitor $C_7$ to one terminal of a resistor $R_{15}$ and an input of the NAND element $M_{10}$, and the other terminal of the resistor $R_{15}$ is grounded. The output of the NAND element $M_{10}$ is connected to inputs of the NAND elements $M_9$, $M_{11}$ and $M_{14}$. The output of the NAND element $M_{11}$ is connected to an input of the NAND element $M_{12}$, the output of the NAND element $M_{12}$, is in turn connected to a trigger input of the flipflop $F_1$ and an input of the NAND element $M_{15}$. The output of the NAND element $M_{13}$ is connected to an input of the NAND element $M_{14}$ whose output is connected to inputs of the NAND elements $M_{13}$ and $M_{15}$. The output of the NAND element $M_{15}$ is connected to an input of the NAND element $M_{16}$. The above-mentioned combinations of the NAND elements $M_5$ and $M_6$, capacitor $C_3$ and resistor $R_7$; of the NAND elements $M_7$ and $M_8$, capacitor $C_4$ and resistor $R_8$; and of the NAND elements $M_9$ and $M_{10}$, capacitor $C_7$ and resistor $R_{15}$ form well-known mono-stable multi-vibrator circuits, respectively. In addition, the NAND elements $M_{13}$ and $M_{14}$ form a well-known flipflop circuit.

An output Q of the flipflop F, in block I is indicated as FP, an output Q of the flipflop $F_1$ in block IV as RP; an output of the NAND element $M_{16}$ in block I as FT, an output of the NAND element $M_{16}$ in block IV as RT; an output of the NAND element $M_{14}$ in block I as FO, and an output of the NAND element $M_{14}$ in block IV as RO. The other circuit compositions are completely the same in blocks I and IV.

Now, the circuit compositions of blocks II and V will be described. A well-known oscillator is formed with capacitors $C_8$ and $C_9$, diodes $D_1$ and $D_2$, resistors $R_{16}$ and $R_{17}$, and NAND elements $M_{43}$ and $M_{17}$. The operation of the oscillator thus formed is as follows:

If it is assumed that an input of the NAND element $M_{43}$ is made to be at an "L" level (low level) by turning on an electrical source switch, the output terminal of the NAND element $M_{43}$ will be at an "H" level (high level), the input terminal of the NAND element $M_{17}$ will be at the "H" level and the output terminal of the NAND element $M_{17}$ will be at the "L" level.

The high potential on the input side of the NAND element $M_{17}$ is lowered through the diode $D_2$ and resistor $R_{17}$ in accordance with a time constant which is proportional to the production of the capacitor $C_9$ and the resistor $R_{17}$. When the potential on the input side of the NAND element $M_{17}$ reaches the "L" level owing to discharge, the output side of the NAND element $M_{17}$ will be at the "H" level. A time $T_1$ for which the output potential of the NAND element $M_{17}$ remains at the "L" level is a half period of the oscillator. If the output terminal of the NAND element $M_{17}$ is made to be at the "H" level, the input terminal of the NAND element $M_{43}$ is changed from "L" level to "H" level, and the output terminal of the NAND element $M_{43}$ is changed from "H" level to "L" level. In the same way as described with respect to the NAND element $M_{17}$, the "H" level of the input terminal of the NAND element $M_{43}$ is changed to the "L" level, and its output terminal is changed from "L" level to "H" level due to the level change caused on the input terminal. A time $T_2$ for which the output potential of the NAND element $M_{43}$ remains at the "L" level is the other half period. An oscillating frequency of the oscillator is represented by an equation $f = 1/T$, where $T = T_1 + T_2$.

The resistor $R_{17}$ and the output terminal of the NAND element $M_{17}$ are connected to the trigger terminal T of the counter $B_1$. An output terminal A of the counter $B_1$ is connected to an input terminal A of the decoder $E_1$, and in the same way output terminals B and C of the counter $B_1$ are connected to input terminals B and C of the encoder $E_1$, respectively. In addition, the output C of the counter $B_1$ is connected to a trigger terminal T of the counter $B_2$. An output A of the counter $B_2$ is connected to an input of NOR element $N_1$, and output terminals B, C and D of the counter $B_2$ are connected to inputs of the NAND element $M_{18}$, respectively. The output terminal D of the counter $B_2$ is further connected to an input of the NAND element $M_{38}$ in block II.

The output of the NAND element $M_{18}$ is connected to an input of the NOR element $N_1$ and an input of the NAND element $M_{21}$. The output of the NOR element $N_1$ is connected to an input of the NAND element $M_{19}$, and the output of the NAND element $M_{19}$ is connected to the input terminal D of the encoder $E_1$ and to an input of the NAND element $M_{20}$. An output terminal "1" of the decoder $E_1$ is connected to an input of the NAND element $M_{29}$, and an output terminal "3" is set-input-terminals S of the flipflops $F_8$ to $F_{13}$. An output terminal "5" of the encoder $E_1$ is connected to an input of the NAND element $M_{28}$, and an output terminal "7" is connected to reset-input-terminals R of the flipflops $F_2$ to $F_7$. The composition thus described up to here will be called block A. Blocks A in blocks II and V can be used in common.

The output of the NAND element $M_{21}$ in block II is connected to a trigger input terminal T of the flipflop $F_2$, and an output terminal $\bar{Q}$ of the flipflop $F_2$ is connected to an input of the NAND element $M_{22}$. An output terminal Q of the flipflop $F_2$ is connected to a trigger input terminal T of the flipflop $F_3$, and an output terminal $\bar{Q}$ of the flipflop $F_3$ is an input of the NAND element $M_{23}$. An output terminal Q of the flipflop $F_3$ is connected to a trigger input terminal T of the flip-flop $F_4$, and an output terminal $\bar{Q}$ of the flipflop $F_4$ is connected to an input of the NAND element $M_{24}$. An output terminal Q of the flipflop $F_4$ is connected to a trigger input terminal T of the flipflop $F_5$, and an output terminal $\bar{Q}$ of the flipflop $F_5$ is connected to an input of the NAND element $M_{25}$. An output terminal Q of the flipflop $F_5$ is connected to a trigger input terminal T of the flipflop $F_6$, and an output terminal $\bar{Q}$ of the flipflop $F_6$ is connected to an input of the NAND element $M_{26}$. An output terminal Q of the flipflop $F_6$ is connected to a trigger input terminal T of the flipflop $F_7$, and an output terminal $\bar{Q}$ of the flipflop $F_7$ is connected to an input terminal of the NAND element $M_{27}$. The flipflops $F_2$ to $F_7$ in combination form a well-known addition counter. The output of the NAND element $M_{28}$ is connected to inputs of the NAND elements $M_{22}$ through $M_{27}$. Output terminal of the NAND elements $M_{22}$ to $M_{27}$ are respectively connected to reset-input-terminals of the flipflops $F_8$ to $F_{13}$.

The output terminal of the NAND element $M_{20}$ is connected to a trigger input terminal T of the flipflop $F_8$, and an output terminal $\bar{Q}$ of the flipflop $F_8$ is connected to a trigger input terminal T of the flipflop $F_9$. An output terminal $\bar{Q}$ of the flipflop $F_9$ is connected to a trigger input terminal T of the flipflop $F_{10}$. An output terminal Q of the flipflop $F_{10}$ is connected to an input terminal D of the flipflop $F_{50}$, and an output terminal $\bar{Q}$ of the flipflop $F_{10}$ is connected to a trigger input terminal T of the flipflop $F_{11}$. An output terminal Q of the flipflop $F_{11}$ is connected to an input terminal D of the flipflop $F_{51}$, and an output terminal $\bar{Q}$ of the flipflop $F_{11}$ is connected to a trigger input terminal T of the flipflop $F_{12}$. In the same way, an output terminal Q of the flipflop $F_{12}$ is connected to an input terminal D of the flipflop $F_{52}$, and an output terminal $\bar{Q}$ of the flipflop $F_{12}$ is connected to a trigger input terminal T of the flipflop $F_{13}$. An output terminal Q of the flipflop $F_{13}$ is connected to an input terminal D of the flipflop $F_{33}$. The flipflops $F_8$ to $F_{13}$ in combination constitute a well-known subtraction counter.

The output terminal of the NAND element $M_{29}$ is connected to trigger-input-terminals T of the flipflops $F_{50}$ to $F_{53}$. An output terminal Q of the flipflop $F_{50}$ is connected to an input terminal of the NAND element $M_{31}$, and an output terminal $\bar{Q}$ of the flipflop $F_{50}$ is connected to an input terminal of the NAND element $M_{32}$. An output terminal Q of the flipflop $F_{51}$ is connected to an input terminal of the NAND element $M_{31}$, and an output terminal $\bar{Q}$ of the flipflop $F_{51}$ is connected to an input of the NAND element $M_{32}$. An output terminal Q of the flipflop $F_{52}$ is connected to an input terminal of the NAND element $M_{31}$, and an output terminal $\bar{Q}$ of the flipflop $F_{52}$ is connected to an input terminal of the NAND element $M_{32}$. An output terminal Q of the flipflop $F_{53}$ is connected to input terminals of the NAND elements $M_{30}$ and $M_{31}$, and an output terminal $\bar{Q}$ of the flipflop $F_{53}$ is connected to input terminals of the NAND elements $M_{32}$, $M_{34}$ and $M_{36}$.

The output terminal of the NAND element $M_{32}$ is connected to inputs of the NAND elements $M_{33}$ and $M_{34}$, and the output terminal of the NAND element $M_{34}$ is connected to an input of the NAND element $M_{35}$. The output terminal of the NAND element $M_{35}$ is connected to an input terminal of the NAND element $M_{36}$, and the output terminal of the NAND element $M_{36}$ is connected to input terminals of the NAND elements $M_{35}$ and $M_{37}$. The output terminal of the NAND element $M_{31}$ is connected to input terminals of the NAND elements $M_{30}$ and $M_{33}$, and the output terminal of the NAND element $M_{30}$ is connected to an input terminal of the NAND element $M_{42}$.

An trigger input terminal FW of the flipflop $F_{14}$ in block II is connected to the previously mentioned output RT in block IV. A trigger input terminal RW of the flipflop $F_{14}$ (which is not shown, but the circuit compositions of blocks II and IV aree the same as stated before) in block V is connected to the previously mentioned output FT. An input FZ of the NAND element $M_{41}$ is connected to one of the outputs RP, RT and RO of block IV. An input RZ of the NAND element $M_{41}$ in block V is connected to one of the outputs FP, ET and FO of block I. An output terminal Q of the filipflop $F_{14}$ is connected to an input terminal of the NOR element $N_2$, an input terminal of the NAND element $M_{39}$, and a trigger input terminal of the flipflop $F_{15}$. An output terminal of the flipflop $F_{15}$ is connected to input terminals of the NAND elements $M_{39}$ and $M_{40}$, and to a trigger input terminal of the flipflop $F_{16}$.

An output terminal Q of the flipflop $F_{16}$ is connected to input terminals of the NAND elements $M_{39}$ and $M_{40}$. The output terminal of the NAND element $M_{40}$ is connected to an input of the NOR element $N_2$, and an input terminal of the NAND element $M_{41}$, and the output terminal of the NAND element $M_{39}$ is connected to reset-input-terminals R of the flipflops $M_{16}$ to $M_{21}$. The output terminal of the NOR element $N_2$ is connected to a trigger input terminal of the flipflop $F_{54}$.

The output terminal of the NAND element $M_{41}$ is connected to a trigger input terminal of the flipflop $F_{17}$, and output terminal Q of the flipflop $F_{17}$ is connected to a trigger input terminal of the flipflop $F_{18}$. An output terminal Q of the flipflop $F_{18}$ is connected to a trigger input terminal of the flipflop $F_{19}$, and an output terminal $\bar{Q}$ of the flipflop $F_{19}$ is connected to an input terminal of the NAND element $M_{41}$. An output terminal Q of the flipflop $F_{19}$ is connected to an input terminal D of the flipflop $F_{54}$. An output terminal of the NAND element $M_{38}$ is connected to a trigger input terminal of the flipflop $F_{20}$, and an output terminal of said flipflop $F_{20}$ is connected to an input trigger terminal of the flipflop $F_{21}$.

An output terminal $\bar{Q}$ of the flipflop $F_{21}$ is connected to an input terminal of the NAND element $M_{38}$ and a set input terminal S of the flipflop $F_{54}$. An output terminal $\bar{Q}$ of the flipflop $F_{54}$ is connected to an input of the NAND element $M_{42}$. The output terminal of the NAND element $M_{42}$ is connected to an input of the NAND element $M_{37}$. The output terminal of the NAND element $M_{33}$ is connected to a resistor $R_{18}$, and the output of the NAND element $M_{37}$ is in turn connected to a resistor $R_{21}$.

Said resistors $R_{18}$ and $R_{21}$ are connected to bases of transistors $T_1$ and $T_3$, respectively, in blocks III and VI. The emitter terminal of the transistor $T_1$ is connected to the electrical source voltage, and its collector terminal is connected to terminals of resistors $R_{19}$ and $R_{20}$. The other terminal of the resistor $R_{20}$ is connected to the base of the transistor $T_2$. The other terminal of the resistor $R_{19}$ and the emitter of the transistor $T_2$ are grounded. The collector terminal of the transistor $T_2$ in block III is connected to one end of the electromagnetic solenoid 22 (FIG. 2) of the actuator 19 used for the front wheels. The other end of the solenoid 22 is connected to the electrical source voltage. The collector terminal of the transistor $T_2$ (not shown) in block VI is connected to one end of the electromagnetic solenoid 24 (FIG. 2) of the actuator 20 used for the rear wheels. The other end of the solenoid 24 is connected to the electrical source voltage. The other terminal of the resistor $R_{21}$ is connected to the base of the transistor $T_3$, the emitter of the transistor $T_3$ is grounded, and the collector of the transistor $T_3$ is connected to resistors $R_{22}$ and $R_{23}$. The other terminal of the resistor $R_{23}$ is connected to the base of the transistor $T_4$. The emitter of the transistor $T_4$ and the other terminal of the resistor $R_{22}$ are connected to the electrical source voltage. . The collector of the transistor $T_4$ in block III is connected to one end of the electromagnetic solenoid 21 of the actuator 19 used for the front wheels, while the other end of the solenoid 21 is grounded. The collector of the transistor $T_4$ (not shown) in block VI is connected to one end of the electromagnetic solenoid 23 of the rear wheel actuator 20, and the other end of the solenoid 23 is grounded.

The functions of the controller thus composed will be described hereinafter: Blocks I and IV are circuits, which produce four kinds of signals: a first one is a signal which is obtained by summing doubled frequencies of the sensors 25 and 25a, or 26 and 26a; a second one is a signal which is obtained by averaging said doubled frequencies; a third one is a signal the frequency of which is the higher of the frequencies of these sensors; and a fourth one is a signal the frequency of which is the lower of said frequencies.

Shown in FIG. 8 are the output conditions of the elements in blocks I and IV. As apparent from FIG. 8, the output of the sensor 25 (26) is amplified through the amplifier $A_1$, and then its wave form is shaped. Pulse signals obtained in the NAND elements $M_1$ and $M_2$ are opposite to each other in phase. The building-down points of the pulse signals are detected by the differentiation circuits. In addition, the output of the sensor 25a (26a) is treated in the same way as the output of the sensor 25, and the building-down points of the pulse signals are detected by the differentiation circuits. The building-down points obtained through detection from both of the sensors are added up by the NAND element $M_5$. In other words, the NAND element $M_5$ produces a signal whose frequency is twice as high as the sum of the frequency of the sensor 25 (26) and that of the sensor 25a (26a). The output of the NAND element $M_8$ has the same frequency as that of the sensor 25 (26), while the output of the NAND element $M_{10}$ has the same frequency as that of the sensor 25a (26a). The output of the NAND element $M_{12}$ has a frequency which is the sum of the frequency of the sensor 25 (26) and that of the sensor 25a (26a). A pulse signal produced at the point EP (RP) has a frequency which is obtained by averaging the frequency of the sensor 25 (26) and that of the sensor 25a (26a).

One of the frequencies of the sensors 25 (26) and 25a (26a), which is lower than the other, is produced at the point FO (RO). In addition, one of the frequencies of the sensors 25 (26) and 25a (26a), which is higher than the other, is produced at the point FT (RT).

The block II (V) is a circuit in which the various signals obtained by block I (IV) is computed in accordance with a predetermined program, and the resultant of this computation is fed to block III (VI). The functional conditions of the previously mentioned block A are shown in FIG. 9.

In block A, the counters $B_1$ and $B_2$ count the output of the previously described oscillating circuit at a period of from 0 to 127, and a clock pulse is obtained by means of the decoder $E_1$, NOR element $N_1$ and NAND element $M_{18}$ thereby to control a computation circuit described below.

Figure 10:
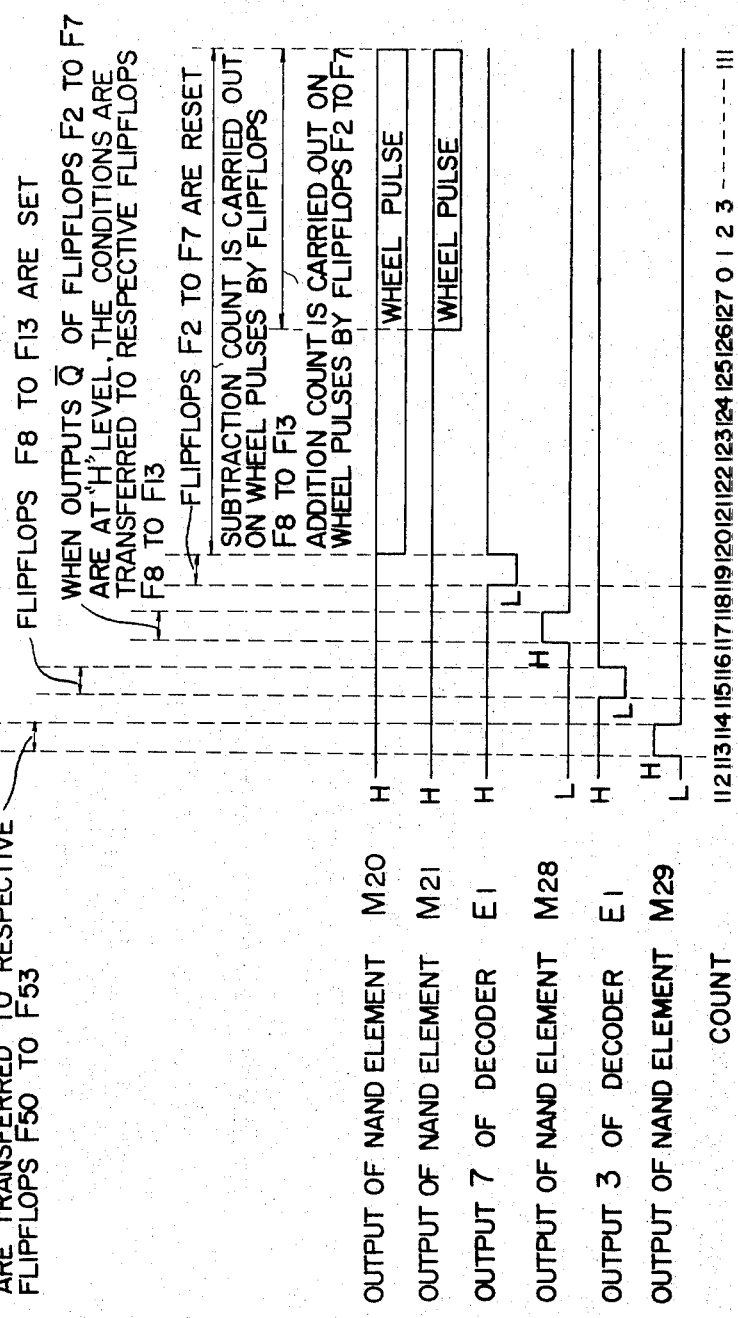

A computation program is shown in FIG. 10. As apparent from FIG. 10, when the clock pulse count goes to 113 the output level of the NAND element $M_{29}$, which is opposite to the level of the output "1" of the decoder $E_1$, is changed from "L" level to "H" level. Therefore, the outputs Q of the flipflops $F_{10}$ to $F_{13}$ are transferred, as they are, to the outputs Q of the flipflops $F_{50}$ to $F_{53}$, respectively, and the condition of the NAND element $M_{29}$ output is maintained unchanged at counts 114 to 127, 0, 1 and 2 to 112.

When the count is 115, the level of the output "3" of the decoder $E_1$ is changed from "H" to "L." Therefore, the flipflops $F_8$ to $F_{13}$ are set, and the outputs Q and $\overline{Q}$ of them are made to be at the "H" and "L" levels, respectively.

When the clock pulse count is 117, the output level of the NAND element $M_{28}$, which is opposite to the level of the output "5" of the decoder $E_1$, is changed from "L" to "H." Therefore, when the other inputs of the NAND elements $M_{22}$ to $M_{27}$ are at the "H" level, that is, the outputs $\overline{Q}$ of the flipflops $F_2$ to $F_7$ are at the "H" level, the outputs of the NAND elements $M_{22}$ to $M_{27}$ are turned to be at the "L" level, as a result of which the flipflops $F_8$ to $F_{13}$ are set so that the outputs Q and $\overline{Q}$ of them are made to be at the "L" and "H" levels, respectively. At this time, since the levels of the outputs $\overline{Q}$ is changed from "L" to "H," the next inputs, namely, the trigger inputs of the flipflops $F_9$ to $F_{13}$ are not activated being free from any influence. As a result, at counts 115 and 117 the conditions of the outputs Q of the flipflops $F_2$ to $F_7$ are transferred, as they are, to the outputs of the flipflops $F_8$ to $F_{13}$, respectively. When the clock pulse count is 119, the level of the output "7" of the decoder $E_1$ is turned from "H" to "L," so that the flipflops $F_2$ to $F_7$ are reset, as a result of which their outputs Q and $\overline{Q}$ are made to be at "L" and "H" levels, respectively. At the counts 120 to 127, 0, 1, and 2 to 111 the output level of the NAND element $M_{19}$, which is opposite to the level of the output of the NOR element $N_1$, is turned to be at the "H" level. Therefore, the output of the NAND element $M_5$ (or the input of the NAND element $M_{20}$), that is, signals responding to wheel pulses having a frequency which is obtained by doubling the sum of the frequencies of two sensors, are produced at the output of the NAND element $M_{20}$, and the flipflops $F_8$ to $F_{13}$ which form the substraction counter as mentioned before and to which the conditions of the flipflops $E_2$ to $F_7$ have been transferred as discribed above, carry out the subtraction count with the signals which respond to the wheel pulses.

Figure 11:
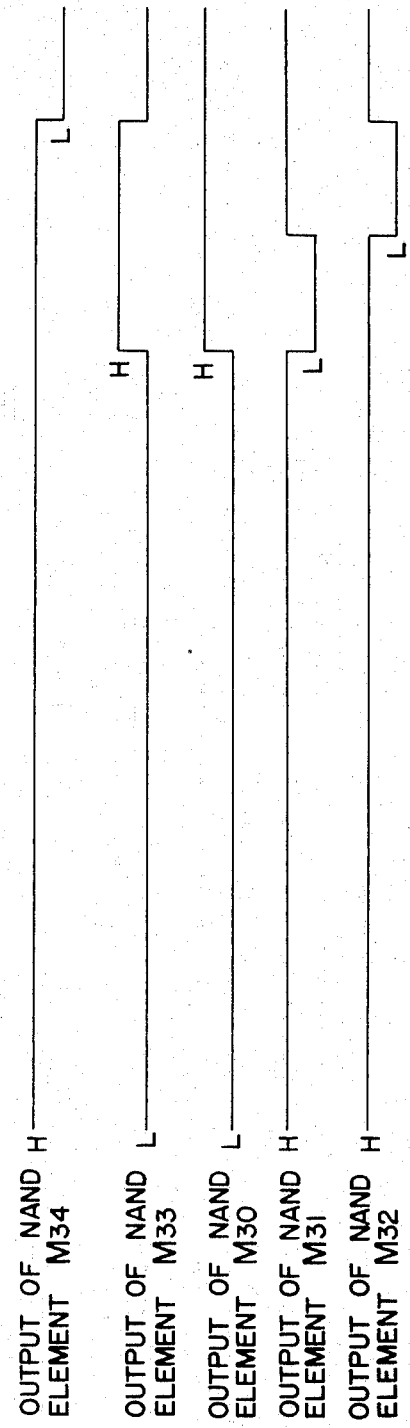

At the counts 0 to 111, the level of the output of the NAND element $M_{18}$ is turned to be "H." Therefore, the output of the NAND element $M_5$ (or the input of the NAND element $M_{21}$), that is, signals responding to wheel pulses having a frequency which is obtained by doubling the sum of the frequencies of two sensors are produced at the output of the NAND element $M_{21}$, and the flipflops $F_2$ to $F_7$ forming the addition counter and having been reset at count 119 carry out the addition count with the signals which respond to the wheel pulses. In other words, a value of [(the number of the wheel pulses between counts 0 and 111 which belong to one period before) — (the number of the wheel pulses between counts 120 and 111)] are stored in the flipflops $F_{50}$ to $F_{53}$. According to the conditions of the flipflops $F_{50}$ to $F_{53}$ the NAND elements $M_{30}$ to $M_{34}$ produce their outputs as shown in FIG. 11. For instance, let's assume that the flipflops $F_2$ to $F_7$ count 20 wheel pulses, the 20 wheel pulses are transferred as count 20 to the flipflops $F_8$ to $F_{13}$ which from the subtraction counter, and then said flipflops $F_8$ to $F_{13}$ count 18 wheel pulses. In this case, count 2 is stored in the flipflops $F_{50}$ to $F_{53}$. In addition, as shown in FIG. 11, the levels of the outputs of the NAND elements $M_{32}$, $M_{31}$, $M_{33}$ and $M_{34}$ are made to be "L," "H," "H" and "H," respectively.

As stated before, the NAND elements $M_{35}$ and $M_{36}$ form the well-known flipflop circuit. When the output of the NAND element $M_{34}$ is at the "L" level, the output of the NAND element $M_{36}$ is maintained at the "L" level until the output $\overline{Q}$ of the flipflop $F_{53}$ is made to be at the "L" level. When the output $\overline{Q}$ of the flipflop $F_{53}$ is at the "L" level, the output of the NAND element $M_{36}$ is maintained at the "H" level until the output of the NAND element $M_{34}$ is made to be at the "L" level.

The groups of the flipflops $F_{14}$, $F_{15}$ and $F_{16}$, the flipflops $F_{17}$, $F_{18}$ and $F_{19}$, and the flipflops $F_{20}$ and $F_{21}$ form well-known counters, respectively. In block II, the output at the point RT, which has the higher of the frequencies of the sensors 26 and 26a, is counted by the flipflops $F_{14}$ to $F_{16}$. In block V, the output at the point FT, which has the higher of the frequencies of the sensors 25 and 25a, is counted by the flipflops $F_{14}$ to $F_{16}$, and these flipflops repeat the functional operation shown in FIG. 12.

When the clock pulse count is 7, the level of the output of the NAND element $M_{39}$ is made to be "L" so as to reset the flipflops $F_{17}$ to $F_{19}$, as a result of which all the outputs Q of said flipflops $F_{17}$ to $F_{19}$ are made to be at the "L" level. Therefore, the output $\overline{Q}$ of the flipflop $F_{19}$ (which is the input of the NAND element $M_{41}$) is made to be at the "H" level. At counts 0 to 5 the output of the NAND element $M_{40}$, which is one of the inputs of the NAND element $M_{41}$, is made to be at the "H" level and the output of said NAND element 41 has a level which is opposite to a level of the point FZ (RZ). In block II, the point FZ is connected to one of the points FP, FT and FO. A wheel pulse signal corresponding to the frequency which is obtained by averaging the frequencies of the sensors 25 and 25a is produced at the point FP. A wheel pulse signal corresponding to the frequency which is the higher of the frequencies of the sensors 25 and 25a is produced at the point FT, while a wheel pulse signal corresponding to the frequency which is the lower of the frequencies of the same sensors 25 and 25a is produced at the point FO. In the case when the road surfaces for the right and left wheels are different from each other and the braking capacities of the right and left wheels are also different; if a braking distance should be considered important, the point FZ is connected to the point FT; if a steering capacity or a travelling stability is considered important, the point FZ is connected to the point FO; and if a middle capacity between above-mentioned capacities is desired, the point FZ is connected to the point FP.

Similarly in clock V, the point RZ is connected to one of the points RP, RT and RO. A wheel pulse signal corresponding to the frequency which is the average of the frequencies of the sensors 26 and 26a is produced at the point RP. A wheel pulse signal corresponding to the frequency which is the higher of the frequencies of the sensors 26 and 26a is produced at the point RT, while a wheel pulse signal corresponding to the frequency which is the lower of the frequencies of the sensors 26 and 26a is produced at the point RO. In the case when the road surfaces for the right and left wheels are different from each other and the braking capacities of the right and left wheels are also different; if a braking distance should be considered important, the point RZ is connected to the point RT; if a travelling stability is considered important, the point RO is connected to the point RZ; and if a middle capacity between above-mentioned two capacities is desired, the point RZ is connected to the point RP. It has been experienced that a good result is obtained when the point FP is connected to the point FZ, and the point RO to the point RZ.

If the flipflops $F_{17}$ to $F_{19}$ (which count wheel pulse during a time period of counts 0 to 5) count wheel pulses more than four during said time period, the output Q of the flipflop $F_{19}$ is made to be at the "H" level while the output $\overline{Q}$ of the same is made to be at the "L" level, and the output of the NAND element $M_{41}$ is maintained at the "H" level until a reset signal is produced by the NAND element $M_{39}$ and ceases the counting of the wheel pulses. When the count reaches 6, the output of the NAND element $M_{40}$ is turned to be at the "L" level, while the output of the NAND element $M_{41}$ is turned to be at the "H" level, as a result of which the flip-flops $F_{17}$ to $F_{19}$ cease the counting operation of the wheel pulses.

On the other hand, the output of the NOR element $N_2$ is brought to be at the "H" level and the output $\overline{Q}$ of the flipflop $F_{19}$ is transferred, as it is, to the output $\overline{Q}$ of the flipflop $F_{54}$. Therefore, if the number of counted pulses is three or less, the output $\overline{Q}$ of the flipflop $F_{54}$ is made to be at the "H" level, and if the number of counted pulses is four or more, the output $\overline{Q}$ of the same flipflop $F_{54}$ is made to be at the "L" level which is maintained for a time period of counts 7 to 5. The flipflops $F_{20}$ and $F_{21}$ are reset at count 7. When they count two outputs D of the counter $B_2$ for a time period of counts 0 through 6, the output $\overline{Q}$ of the flipflop $F_{21}$ is turned to be at the "L" level, while the output of the NAND element $M_{38}$ is maintained at the "H" level, and both the set input and output $\overline{Q}$ of the flipflop $F_{54}$ are made to be at the "L" level.

However, the resetting period at count 7 is so short, when a vehicle is travelling at a high speed, that the reset signal is applied to the flipflops $F_{20}$ and $F_{21}$ before they complete counting of said two outputs D, as a result of which the flipflop $F_{21}$ is not made to be at the "L" level. The flipflop $F_{54}$ is arranged so that its output $\overline{Q}$ be at the "L" level without fail when the vehicle stops. The output of the NAND element $M_{42}$ is made to be at the "L" level only when the output Q of the flipflop $F_{54}$ is at the "H" level and the output of the NAND element $M_{30}$ is at the "H" level. The output of the NAND element $M_{37}$ is turned to be at the "H" level when any of the outputs of the NAND elements $M_{42}$ and $M_{36}$ is at the "L" level.

Blocks III and VI are circuits which operate the valves of the actuators 19 and 20 shown in FIGS. 1 and 2. When the output of the NAND element $M_{33}$ is at the "H" level, both transistors $T_1$ and $T_2$ become non-conductive. As a result, no current flows through the electromagnetic solenoid 22 (24) and the pressure-reducing rate and pressure-restoring rate of the actuator are caused to be slow. On the contrary, if the output of the NAND element $M_{33}$ is at the "L" level, both transistors $T_1$ and $T_2$ are made conductive. Therefore, and electrical current flows through the electromagnetic solenoid 22 (24), as a result of wyich the pressure-reducing rate and pressure-restoring rate of the actuator are made faster those mentioned with respect to the case where the transistors $T_1$ and $T_2$ are non-conductive.

On the other hand, when the output of the NAND element $M_{37}$ is at the "H" level, both transistors $T_3$ and $T_4$ are caused to be conductive, so that an electric current flows through the electromagnetic solenoid 21 (23). As a result, the actuator reduces the pressure and this pressure-reducing rate depends on the conditions of the electro-magnetic solenoid 22 (24).

On the contrary, when the output of the NAND element $M_{37}$ is at the "L" level, both transistors $T_3$ and $T_4$ are made to be non-conductive so that no electric current flows through the electromagnetic solenoid 21 (23). Therefore, the actuator restores the pressure, and the pressure-restoring rate depends on the conditions of the solenoid 22 (24). The electric current flows through the electromagnetic solenoid 22 (24) only in the case of counts 4 to 59, but the current does not flow through the solenoid 22 (24) in the case of counts 60 to 3. An electric current flows through the electromagnetic solenoid 21 (23) when either one of the outputs of the NAND elements $M_{42}$ and $M_{36}$ is at the "L" level, but the electric current does not flow through the solenoid 21 (23) when both the outputs of the NAND elements $M_{42}$ and $M_{36}$ are at the "H" level. When the vehicle is travelling at a normal steady speed, a time period for the subtraction count is longer than that for the addition count as shown in FIG. 10. Therefore, the count shown in FIG. 11 goes to 0, 63, 62 - - - -, and the higher the vehicle speed is the more leftwardly the count goes on the table of FIG. 11. Accordingly, the output of the NAND element $M_{34}$ appears to be at the "H" level, the output $\overline{Q}$ of the flipflop $F_{53}$ appears to be at the "L" level, and the output of the NAND element $M_{36}$ appears to be at the "H" level. Since the wheel pulse frequencies at the points FW and FZ are substantially the same, the flipflops $F_{17}$ to $F_{19}$ count four pulses or more. At the same time, the output $\overline{Q}$ of the flipflop $F_{54}$ is made to be at the "L" level, and the output of the NAND element $M_{42}$ is made to be at the "H" level. Therefore, when the vehicle is travelling at the normal steady speed, the output of the NAND element $M_{37}$ appears to be at the "L" level, as a result of which no electric current flows through the electro-magnetic solenoid 21 (23) and a normal braking condition is maintained.

Now, when an emergency braking action is applied to the wheels, the wheel pulse frequency is abruptly reduced. Therefore, the subtraction count number is considerably reduced when compared with the addition count number shown in FIG. 10. The count shown in FIG. 11 moves to 4, 5, 6, 7 - - - . The more abruptly the wheel pulse frequency is reduced and the lower the vehicle speed is, the more rightwardly the count moves on the table of FIG. 11. Accordingly, the output of the NAND element $M_{34}$ is at the "L" level, the output of the NAND element $M_{36}$ is also at the "L" level, and the output of the NAND element $M_{37}$ is at the "H" level. As a result, an electric current flows through the electromagnetic solenoid 21 (23) and the braking pressure is reduced. On the other hand, the output of the NAND element $M_{33}$ is made to be at the "L," so that the electromagnetic solenoid 22 (24) is fed with an electric current and the pressure-reducing rate is caused to be fast. Accordingly, the gradually reducing rate of the wheel pulse frequency is lowered, and finally the wheel pulse frequency comes to increase.

During this time period, the count shown in FIG. 11 moves to 8, 7, 6, 5, 4, 3, 2, 1, 0, 63, 62 - - -. When it moves to 3, the output of the NAND element $M_{33}$ is turned to be at the "H" level, but the output of the NAND element $M_{36}$ is still maintained at the "L" level. Therefore, the brake-controlling pressure is reduced at a slow rate. When the count reaches 63, the output of the NAND element $M_{36}$ is turned to be at the "H" level. In this case, if the output of the NAND element $M_{42}$ is at the "H" level, the output of the NAND element $M_{37}$ is changed to be at the "L" level and the brake-controlling pressure increases. On the other hand, since the output of the NAND element $M_{33}$ is at the "H" level, the pressure-increasing rate with respect to the brake-controlling pressure is made to be slow (if the output of the NAND element $M_{42}$ is at the "L" level, the brake pressure is reduced at a slower rate). Under this condition, if the wheel pulse frequency increases and the count shown in FIG. 11 comes to 59, 58, 57 - - - , the output of the NAND element $M_{30}$ is made to be at the "L" level and the output of the NAND element $M_{42}$ is turned to be at the "H" level. On the other hand, since the output of the NAND element $M_{36}$ is maintained at the "H" level, the output of the NAND element $M_{37}$ is turned to be at the "L" level without fail thereby to restore the brake-controlling pressure, and the output of the NAND element $M_{33}$ is brought to be at the "L" level whereby the pressure-restoring rate is made to be fast. With this condition, the wheel pulse frequency decreases gradually.

When the count shown in FIG. 11 reaches 60, 61, 62, 63, 0, 1, 2, 3 - - - and the output of the NAND element $M_{42}$ is at the "H" level, the output of the NAND element $M_{36}$ is at the "H" level. As a consequence, the brake-controlling pressure is under the pressure-restoring condition. At the same time, since the output of the NAND element $M_{33}$ is at the "H" level, the pressure-restoring rate is slow (if the output of the NAND element $M_{42}$ is at the "L" level, the brake pressure decreases at a slower rate). In addition, in the case when the wheel pulse frequency abruptly decreases, the count shown in FIG. 11 comes to 4, 5, 6, 7 - - - , and the above-mentioned operation is repeated.

Only when the wheel pulse signal at the point FZ (RZ) provides three pulses or less while the wheel pulse signal at the point FW (RW) provides six pulses, the output $\overline{Q}$ of the flipflop $F_{54}$ is made to be at the "H" level. In this case, if the output of the NAND element $M_{30}$ is at the "H" level, that is, the count shown in FIG. 11 is 60, 61, 63, 0, 1, 2, 3 - - - , the output of the NAND elements $M_{42}$ is turned to be at the "L" level and the output of the NAND element $M_{37}$ is made to be at the "H" level regardless of the output level of the NAND element $M_{36}$. As a result of which the brake controlling pressure is reduced. This reducing rate is determined by the conditions of the count of FIG. 11 in the same manner as described above. However, when the wheel pulse frequency at the point FW (RW) is lower than a predetermined value, the output $\overline{Q}$ of the flipflop $F_{21}$ is turned to be at the "L" level thereby to set the flipflop $F_{54}$, as a result of which the output $\overline{Q}$ of the flipflop $F_{54}$ is made to be at the "L" level, and the output of the NAND element $M_{42}$ is made to be at the "H" level. In this case, if the output of the NAND element $M_{36}$ is at the "H" level, the brake pressure is restored.

When engine brake is applied to the driving wheels, the wheel pulse signal at the point FZ (RZ) provides three pulses or less while the wheel pulse signal at the point FW (RW) provides six pulses, and it is often observed that the wheel pulse signal of the driving wheel provides three pulses or less while the wheel pulse signal of the driven wheel provides six pulses. In addition, in the case where the coefficient of friction $\mu$ between a road surface and a wheel tire is small and a front wheel is provided with a disk brake, even if the brake-controlling pressure is reduced, the wheel pulse frequency may increase at a very slow rate because of the dragging torque of the disk brake, and therefore the number of the front wheel pulses is frequently three or less while the rear wheel pulse signal provides six pulses. This occurs even if one wheel is locked, in the case when the point FO (RO) is connected to the point FZ (RZ). In this embodiment, the point RT (FT) is connected to the point FW (RW). However, if a circuit is available which obtains the frequency of a sensor which is the highest of the frequencies of the sensors 25, 25a, 26 and 26a (the circuit is described in detail in Japanese Application No. 45-112234), the point FW (RW) may be connected to the circuit instead of the point RT (FT).

We claim:

1. A digital type brake control system for braking the front and rear wheels of a vehicle which comprises:

a master cylinder;

wheel cylinders of said wheels;

passage means for communicating between said master cylinder and said wheel cylinders;

actuator means provided in said passage means, said actuator means including valve means for opening and closing said passage means and means for varying fluid volumes presented between said valve means and said wheel cylinders;

sensor means for sensing the rotational conditions of at least one of said wheels and providing output signals representative thereof;

conversion circuit means operating to carry out amplification and waveform-shaping of said output signals from said sensor means and to convert the thus treated output signals into respective wheel pulse signals;

control circuit means for providing control signals and comprising a clock pulse oscillator, free running counter means and a decoder;

addition and subtraction circuit means comprising addition and subtraction counters, gate circuits and register circuits, said addition and subtraction circuit means, obtaining, in cooperation with said control signals, a difference between a number of pulses which is obtained by counting said wheel pulse signals for a predetermined period of time beginning at an optional time and a number of pulses which is obtained by counting the wheel pulse signals for a predetermined period of time beginning at a different optional time;

a first comparison circuit means for comparing the difference in pulse number obtained by said addition and subtraction circuit means with a first predetermined number of pulses, and for producing a pressure-reducing signal so as to operate said actuator means when the difference in pulse number is greater than said first predetermined number of pulses; and a second comparison circuit means for comparing the difference in pulse number obtained by the addition and subtraction circuit with a second predetermined number of pulses, and for producing an instruction signal for reducing the rate of varying the fluid volume obtained by said actuator means, when the difference in pulse number is smaller than the second predetermined number of pulses.

2. A digital type brake control system for braking the front and rear wheels of a vehicle which comprises:

a master cylinder;

wheel cylinders of said wheels;

passage means for communicating between said master cylinder and said wheel cylinders;

actuator means provided in said passage means, said actuator means including valve means for opening and closing said passage means and means for varying fluid volumes presented between said valve means and the wheel cylinders;

sensor means for sensing the rotational conditions of said wheels and providing output signals representative thereof;

conversion circuit means operating to carry out the amplification and waveform-shaping of said output signals from said sensor means and to convert the thus treated output signals into respective wheel pulse signals.

control circuit means for providing control signals and comprising a clock pulse oscillator, free running counter means and a decoder;

addition and subtraction circuit means comprising addition and subtraction counters, gate circuits and register circuits, said addition and subtraction circuit means obtaining, in cooperation with said control signals, a difference between a number of pulses which is obtained by counting said wheel pulse signals corresponding to at least one of said wheels for a predetermined period of time beginning at an optional time and a number of pulses which is obtained by counting the wheel pulse signal for a predetermined period of time beginning at a different optional time;

a first comparison circuit means for comparing the difference in pulse number obtained by said addition and subtraction circuit means with a predetermined number of pulses, and for producing a pressure-reducing signal when the difference in pulse number is greater than said predetermined number of pulses;

a first detection circuit means for detecting the wheel pulse signal corresponding to that one of said wheels which has the higher rotational speed, and providing a first output signal representative thereof;

a second detection circuit means for detecting the wheel pulse signal corresponding to at least one of said wheels other than said wheel having the higher rotational speed and providing a second output signal respresentative thereof;

a second comparison circuit means for comparing said first output signal of said first detection circuit means with said second output signal of said second detection circuit means, said second comparison circuit means producing a pressure-reducing signal when the ratio of the frequency of the wheel pulse signal of said second detection circuit means to that of said first detection circuit is smaller than a predetermined ratio; and a logical circuit means for operating said actuator means in accordance with a logical addition of said pressure-reducing signal from said first comparison circuit means and that from said second comparison circuit means.

3. A digital type control system as claimed in claim 2 wherein said addition and subtraction circuit means operates with a respective one pair of wheels from among the paired front wheels and rear wheels, said first detection circuit means operatively corresponds to the faster of the other pair of wheels among the paired front wheels and rear wheels; and said second detection circuit means operatively corresponds to at least one wheel of said one pair of wheels.

4. A digital type vehicle brake control system as claimed in claim 2 which further comprises;

circuit means for operating said actuator means so as to reduce the fluid volume in said system when said difference in pulse number obtained by said addition and subtraction circuit means comes within another predetermined number of pulses.

5. A digital type brake control system as claimed in claim 2 which further comprises:

circuit means for suspending generation of said pressure-reducing signal in said second comparison circuit means when the rotational speed of that wheel having the higher rotational speed is reduced to a predetermined value.

6. A digital type brake control system as claimed in claim 2 which further comprises;

a third comparison circuit means for comparing the difference in pulse number obtained by said addition and subtraction circuit means with a second predetermined number of pulses, said third comparison circuit means producing an instruction signal to reduce the rate of varying the fluid volume which is provided by said actuator means when the difference in pulse number is smaller than the second predetermined number of pulses.

* * * * *